United States Patent
Belanger et al.

(10) Patent No.: US 11,577,696 B2
(45) Date of Patent: Feb. 14, 2023

(54) HVAC CASE

(71) Applicant: DENSO International America, Inc., Southfield, MI (US)

(72) Inventors: Brian Belanger, Farmington Hills, MI (US); Kyle Stabile, Livonia, MI (US); Nicholaus Spunar, Southfield, MI (US); Li Zhang, Southfield, MI (US)

(73) Assignee: DENSO International America, Inc., Southfield, MI (US)

( * ) Notice: Subject to any disclaimer, the term of this patent is extended or adjusted under 35 U.S.C. 154(b) by 444 days.

(21) Appl. No.: 16/814,188

(22) Filed: Mar. 10, 2020

(65) Prior Publication Data

US 2020/0307520 A1  Oct. 1, 2020

Related U.S. Application Data

(60) Provisional application No. 62/823,941, filed on Mar. 26, 2019.

(51) Int. Cl.
| | | |
|---|---|---|
| *B60S 1/02* | (2006.01) | |
| *B60S 1/54* | (2006.01) | |
| *B60H 1/00* | (2006.01) | |
| *B60H 1/34* | (2006.01) | |

(52) U.S. Cl.
CPC ............ *B60S 1/023* (2013.01); *B60H 1/3407* (2013.01); *B60S 1/54* (2013.01)

(58) Field of Classification Search
CPC ........ B60S 1/54; B60S 1/023; B60H 1/00671; B60H 1/3407; B60H 2001/00721
See application file for complete search history.

(56) References Cited

U.S. PATENT DOCUMENTS

| | | | |
|---|---|---|---|
| 2004/0203333 A1* | 10/2004 | Yeon .................. | B60H 1/00564 |
| | | | 454/121 |
| 2008/0256966 A1* | 10/2008 | Kawashima ....... | B60H 1/00842 |
| | | | 62/239 |
| 2019/0047355 A1* | 2/2019 | Rothenberg ....... | B60H 1/00678 |

FOREIGN PATENT DOCUMENTS

FR  2863945 A1 *  6/2005  ........... B60H 1/0055

* cited by examiner

*Primary Examiner* — Steven S Anderson, II
(74) *Attorney, Agent, or Firm* — Harness, Dickey & Pierce, P.L.C.

(57) ABSTRACT

An HVAC case configured to heat airflow for a vehicle HVAC system. The HVAC case has a defrost outlet, a primary demist outlet, a secondary demist outlet, and an airflow control door. The airflow control door is configured to control airflow through each one of the defrost outlet, the primary demist outlet, and the secondary demist outlet.

18 Claims, 4 Drawing Sheets

US 11,577,696 B2

HVAC CASE

CROSS-REFERENCE TO RELATED APPLICATION

This application claims the benefit of U.S. Provisional Application No. 62/823,941 filed on Mar. 26, 2019, the entire disclosure of which is incorporated herein by reference.

FIELD

The present disclosure relates to a heating, ventilation, and air conditioning (HVAC) case including an airflow control door for controlling defrost and demist airflow.

BACKGROUND

This section provides background information related to the present disclosure, which is not necessarily prior art.

Conventional heating, ventilation, and air conditioning (HVAC) systems include a case that defines defrost and demist outlets. Different HVAC modes (e.g., defrost, foot, face, etc.) call for different levels of airflow through the defrost and demist outlets. To control defrost and demist airflow, conventional HVAC cases include a complex series of airflow control doors and door linkages. While current HVAC cases are suitable for their intended use, they are subject to improvement. The present disclosure provides for an improved HVAC case including the advantages set forth herein, as well as numerous additional advantages as one skilled in the art will recognize.

SUMMARY

This section provides a general summary of the disclosure, and is not a comprehensive disclosure of its full scope or all of its features.

The present disclosure includes an HVAC case configured to heat airflow for a vehicle HVAC system. The HVAC case has a defrost outlet, a primary demist outlet, a secondary demist outlet, and an airflow control door. The airflow control door is configured to control airflow through each one of the defrost outlet, the primary demist outlet, and the secondary demist outlet.

The present disclosure further includes an HVAC case configured to heat airflow for a vehicle HVAC system. The HVAC case includes a defrost outlet, a primary demist outlet, a secondary demist outlet, and an airflow control door. The airflow control door is configured to be rotated to a defrost mode position in which the airflow control door permits airflow out of the HVAC case through each one of the defrost outlet, the primary demist outlet, and the secondary demist outlet. The airflow control door is further configured to be rotated to a foot mode position in which the airflow control door limits the airflow from exiting the HVAC case through the defrost outlet and the primary demist outlet, and permits airflow out of the HVAC case through the secondary demist outlet. The airflow control door is still further configured to be rotated to a face mode position in which the airflow control door blocks the airflow from exiting the HVAC case through the defrost outlet, the primary demist outlet, and the secondary demist outlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
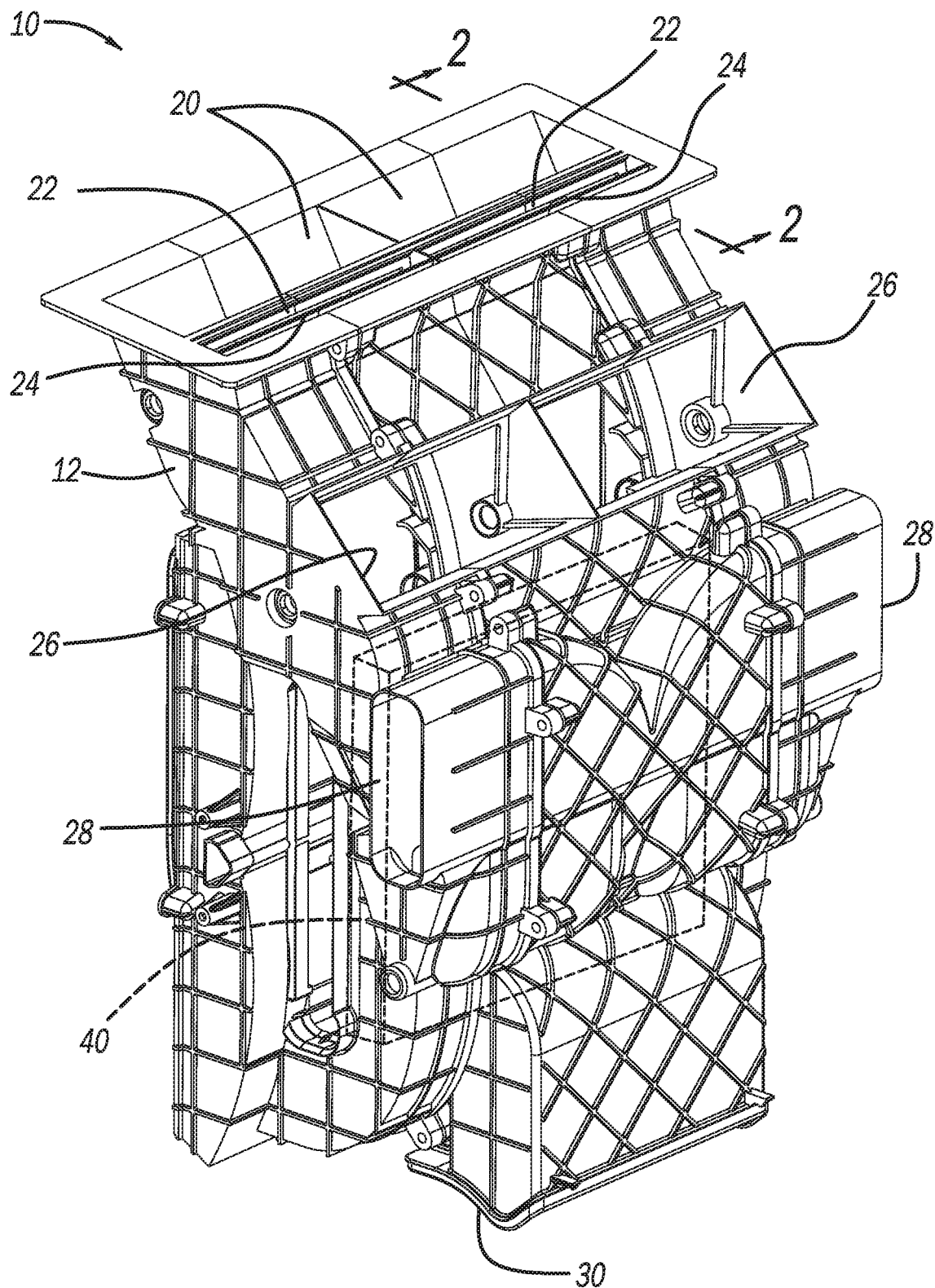
FIG. 1 is a perspective view of a heating, ventilation, and air conditioning case in accordance with the present disclosure.

FIG. 1 illustrates an exemplary heating, ventilation, and air conditioning (HVAC) case 10 in accordance with the present disclosure. The HVAC case 10 is configured for use with any suitable vehicle HVAC system to heat airflow. The HVAC case 10 may be installed in any suitable vehicle, such as any suitable passenger vehicle, mass transit vehicle, recreational vehicle, construction vehicle/equipment, military vehicle/equipment, watercraft, aircraft, etc. The HVAC case 10 may also be configured for use with any suitable non-vehicular application, such as any application calling for defrost and demist airflow to a window or any other suitable surface.

The HVAC case 10 includes a housing 12, which defines a plurality of outlets through which airflow exists the HVAC case 10. Specifically, the housing 12 defines one or more defrost outlets 20, which direct heated airflow to a windshield of the vehicle to defrost the windshield. Adjacent to the defrost outlets 20 are primary demist outlets 22 and secondary demist outlets 24. The primary demist outlets 22 are arranged between the defrost outlets 20 and the secondary demist outlets 24. The primary demist outlets 22 are larger than the secondary demist outlets 24. The defrost outlets 20 are larger than the primary and secondary demist outlets 22 and 24 combined. The primary and secondary demist outlets 22 and 24 direct heated airflow to side windows of the vehicle to demist the side windows. The housing 12 further defines face outlets 26, which are configured to direct airflow towards an upper portion of a vehicle cabin, such as towards the faces of occupants of the cabin. The housing 12 further defines foot outlets 28 and one or more rear zone outlets 30. Within the HVAC case 10 is a heater core 40. The heater core 40 is configured to heat airflow generated by a blower of an HVAC system that the HVAC case 10 is included with.

Figure 2:
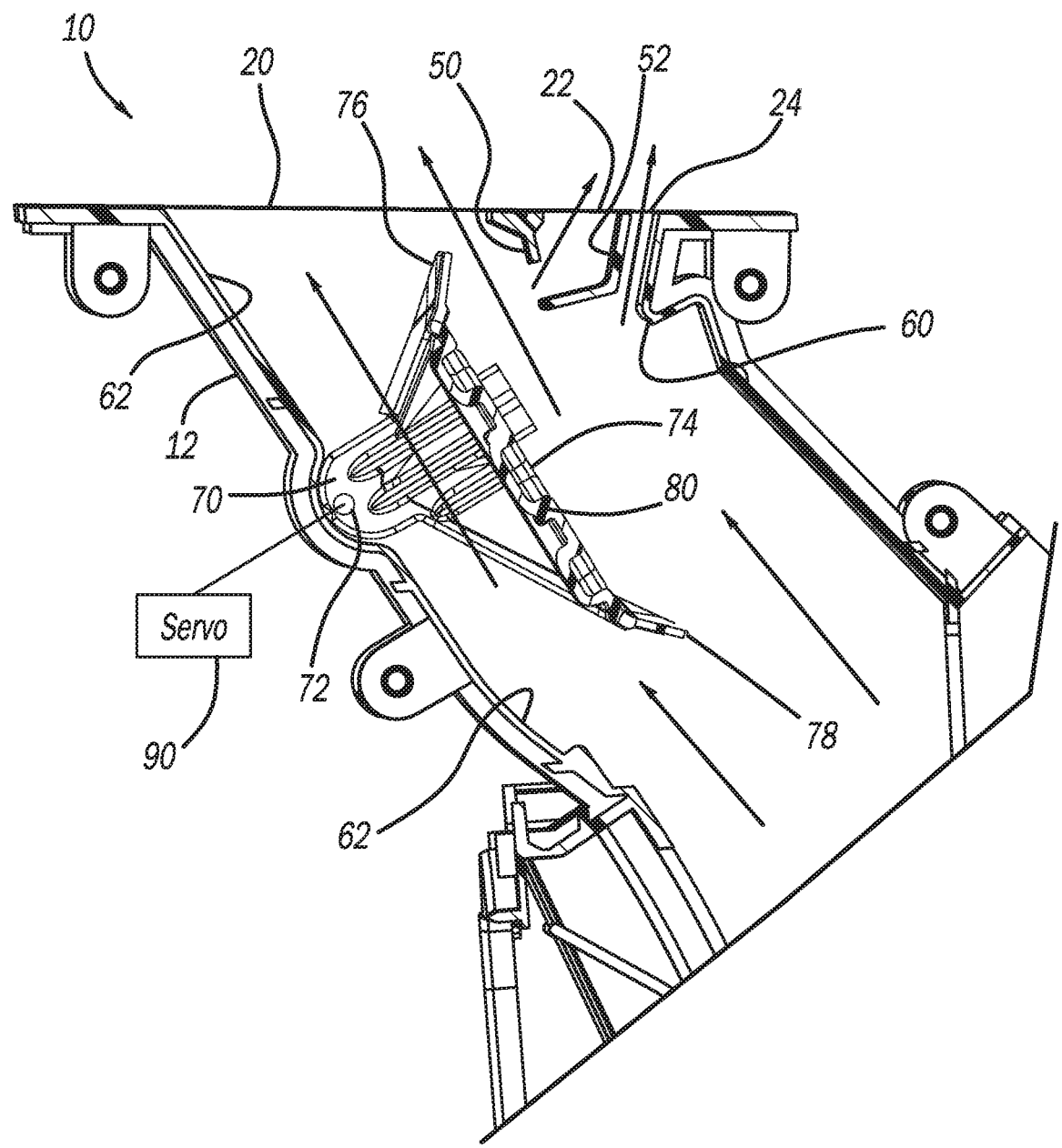
FIG. 2 is a cross-sectional view taken along line 2-2 of FIG. 1 showing an airflow control door of the HVAC case in a defrost mode position.

With continued reference to FIG. 1 and additional reference to FIG. 2, the defrost outlets 20 and the primary demist outlets 22 are separated by a defrost/demist outlet divider 50 of the housing 12. The primary demist outlets 22 and the secondary demist outlets 24 are separated by a primary and secondary demist outlet divider 52 of the housing 12. The primary and secondary demist outlet divider 52 may be L-shaped, as illustrated.

The primary demist outlets 22 are defined by, and are between, the defrost/demist outlet divider 50 and the primary and secondary demist outlet divider 52. The secondary demist outlets 24 are defined between the primary and secondary demist outlet divider 52 and a first inner surface 60 of the housing 12. The defrost outlets 20 are defined between the defrost/demist outlet divider 50 and a second inner surface 62 of the housing 12. The first inner surface 60 is generally opposite to the second inner surface 62.

The HVAC case 10 further includes an airflow control door 70. The airflow control door 70 may be any suitable airflow control member configured to control airflow through each one of the defrost outlets 20, the primary demist outlets 22, and the secondary demist outlets 24. In the example illustrated, the airflow control door 70 is a rotatable door rotatable about a rotation axis 72. The airflow control door 70 may be rotated in any suitable manner, such as by any suitable servo 90. The airflow control door 70 extends across a width of the housing 12 such that the airflow control door 70 extends across each one of the defrost outlets 20, the primary demist outlets 22, and the secondary demist outlets 24 from one side of the housing 12 to another, opposite side of the housing 12.

The airflow control door 70 includes a main body portion 74, which is between a first end 76 and a second end 78 of the airflow control door 70. Extending across the main body portion 74 from the first end 76 to the second end 78 is a seal 80. The seal 80 may be any suitable airtight seal for sealing against the first and second inner surfaces 60, 62 of the housing, as well as against the primary and secondary demist outlet divider 52, as described herein.

The airflow control door 70 may be rotated by the servo 90 about the rotation axis 72 to control airflow through each one of the defrost outlets 20, the primary demist outlets 22, and the secondary demist outlets 24. For example and as illustrated in FIG. 2, in a defrost mode position the airflow control door 70 is positioned to permit airflow heated by the heater core 40 to exit the HVAC case 10 through each one of the defrost outlets 20, the primary demist outlets 22, and the secondary demist outlets 24 to defrost the windshield and demist the side windows. In the defrost mode position of FIG. 2, the airflow control door 70 is arranged such that the seal 80 extends generally parallel to the direction of airflow exiting the HVAC case 10 through the defrost outlets 20.

Figure 3:
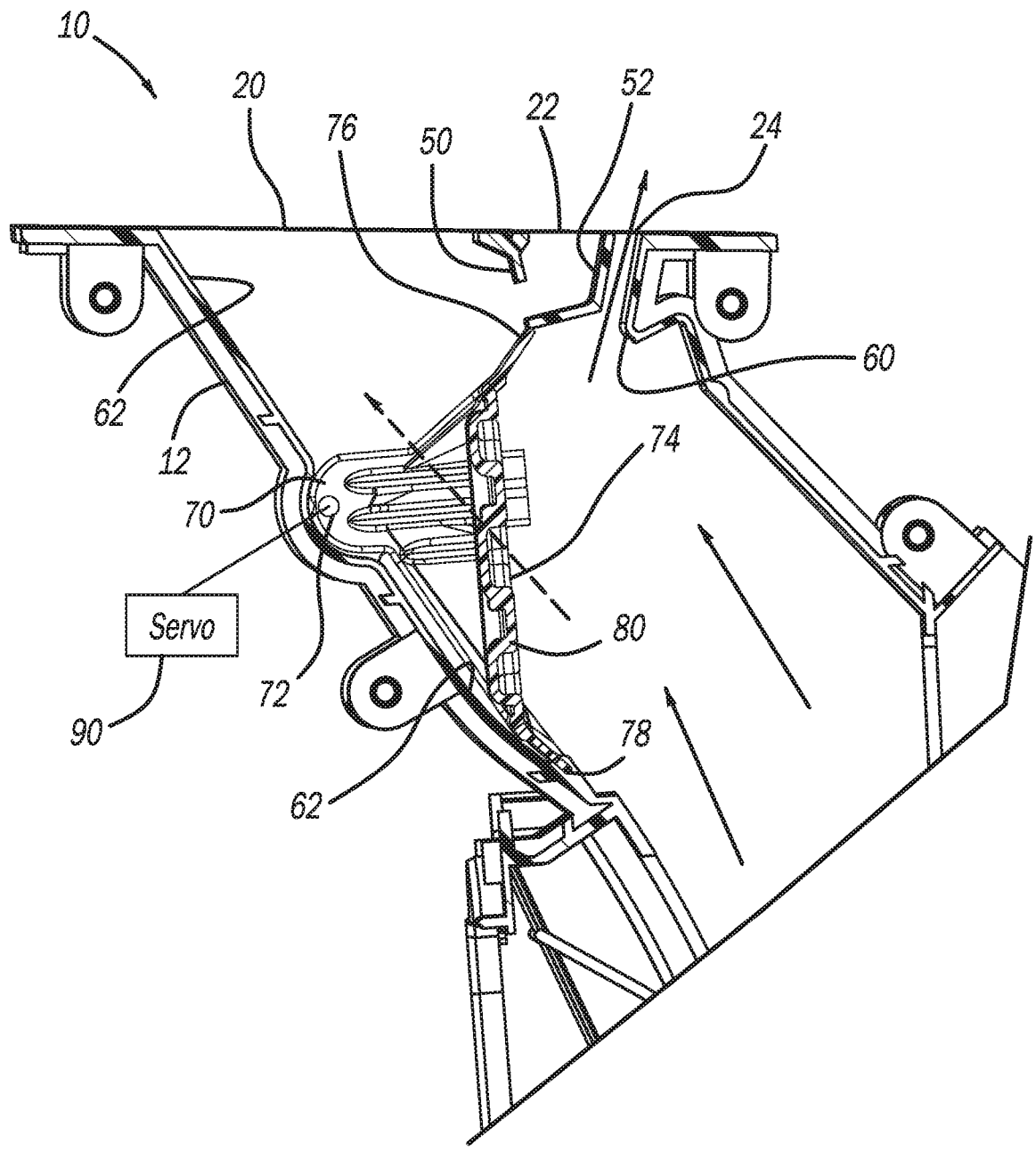
FIG. 3 is a cross-sectional view of the HVAC case of FIG. 1 showing the airflow control door in a foot mode position.

FIG. 3 illustrates the airflow control door 70 rotated to a foot mode position. In the foot mode position, the airflow control door 70 is positioned such that the first end 76 seals against the primary and secondary demist outlet divider 52, and the second end 78 seals against the second inner surface 62 of the housing 12. In the foot mode position of FIG. 3, the airflow control door 70 is positioned to limit or block airflow from exiting the HVAC case 10 through the defrost outlets 20 and the primary demist outlets 22. Thus, airflow heated by the heater core 40 exits the housing 12 through the secondary demist outlets 24, and also the foot outlets 28. In the foot mode position of FIG. 3, a reduced amount of demist airflow exits the HVAC case 10 as compared to the defrost mode of FIG. 2 because the primary demist outlets 22 are closed or partially closed. In this manner, the single airflow control door 70 is able to control the amount of demist airflow exiting the HVAC case 10.

Figure 4:
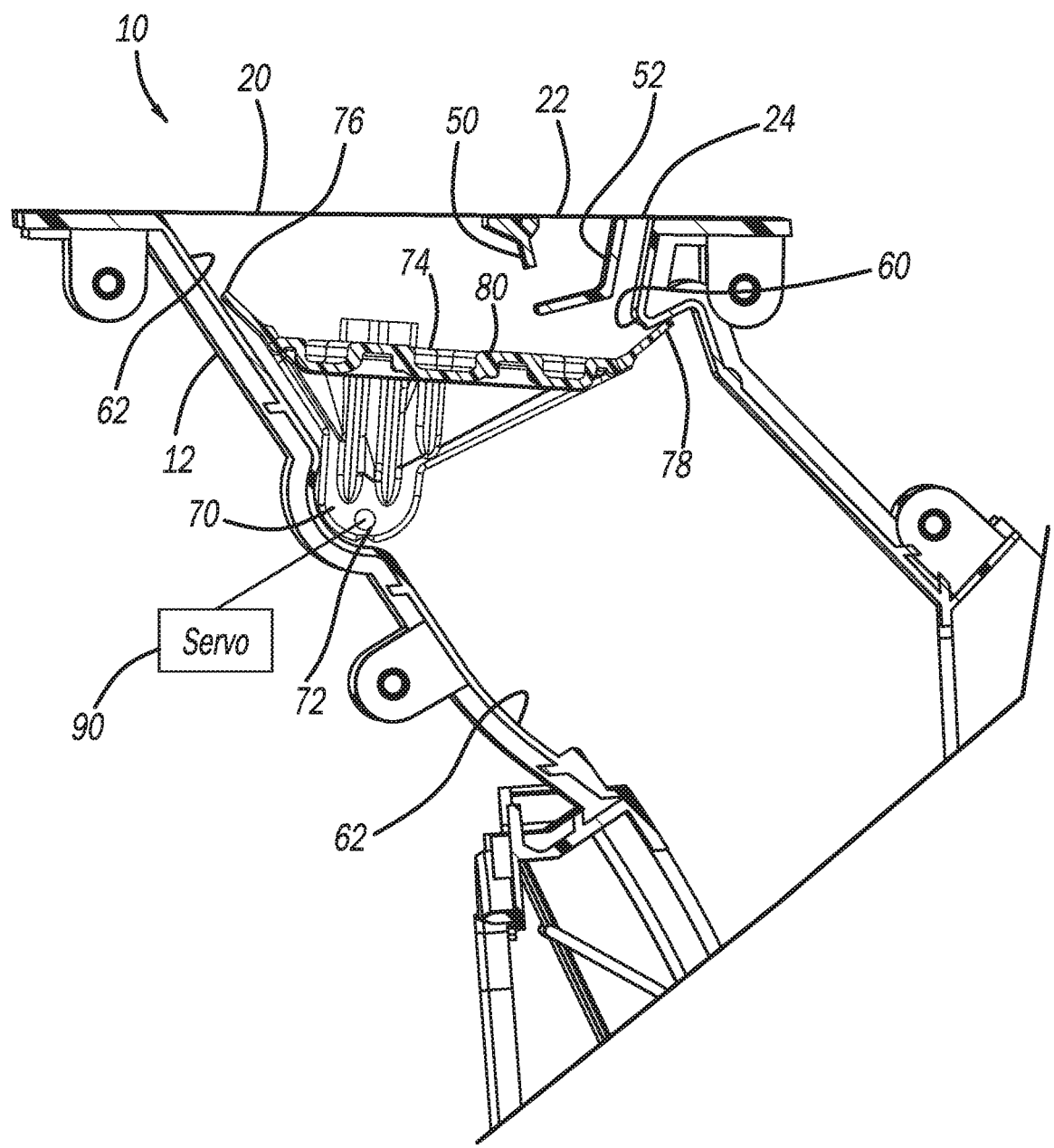
FIG. 4 is a cross-sectional view of the HVAC case of FIG. 1 showing the airflow control door in a face mode position.

FIG. 4 illustrates the airflow control door 70 in a face mode position. In the face mode position of FIG. 4, the airflow control door 70 seals at the first inner surface 60 and the second inner surface 62 of the housing 12 to limit or block airflow from exiting the HVAC case 10 through the defrost outlets 20, the primary demist outlets 22, and the secondary demist outlets 24. In the face mode, airflow only exits the HVAC case 10 through the face outlets 26.

The HVAC case 10 thus advantageously controls the amount of heated airflow exiting the HVAC case 10 through the defrost outlets 20 and the primary and secondary demist outlets 22, 24 in the defrost mode of FIG. 2, the foot mode of FIG. 3, and the face mode of FIG. 4 using only the single airflow control door 70. The amount of demist airflow is controlled by having the separate primary and secondary demist outlets 22 and 24, and only allowing airflow to exit the smaller secondary demist outlets 24 in the foot mode so that demist airflow in the foot mode is relatively less than demist airflow in the defrost mode of FIG. 2. The relative sizes of the primary demist outlets 22 and the secondary demist outlets 24 can be varied to provide further control over the amount of airflow exiting the HVAC case 10 in each one of the defrost mode (FIG. 2) and the foot mode (FIG. 3).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An HVAC case configured to heat airflow for a vehicle HVAC system, the HVAC case comprising:
    a defrost outlet;
    a primary demist outlet;
    a secondary demist outlet; and
    an airflow control door configured to control airflow through each one of the defrost outlet, the primary demist outlet, and the secondary demist outlet;
    wherein:
        the primary demist outlet is between the defrost outlet and the secondary demist outlet; and
        each of the defrost outlet, the primary demist outlet, and the secondary demist outlet span a width of the HVAC case and overlap along a depth of the HVAC case, the width is perpendicular to, and longer than, the depth.

2. The HVAC case of claim 1, wherein the primary demist outlet is larger than the secondary demist outlet.

3. The HVAC case of claim 1, wherein the HVAC case includes a housing defining the defrost outlet, the primary demist outlet, and the secondary demist outlet.

4. The HVAC case of claim 1, wherein the airflow control door is rotatable about a rotation axis.

5. The HVAC case of claim 1, wherein the airflow control door is movable to a first position in which the airflow control door permits airflow out of each one of the defrost outlet, the primary demist outlet, and the secondary demist outlet.

6. The HVAC case of claim 1, wherein the airflow control door is movable to a second position in which the airflow control door closes the defrost outlet, closes the primary demist outlet, and permits airflow out of the secondary demist outlet.

7. The HVAC case of claim 1, wherein the airflow control door is movable to a third position in which the airflow control door closes each one of the defrost outlet, the primary demist outlet, and the secondary demist outlet.

8. The HVAC case of claim 7, wherein in the third position the airflow control door seals against opposing surfaces of the HVAC case.

9. An HVAC case configured to heat airflow for a vehicle HVAC system, the HVAC case comprising:
    a defrost outlet;
    a primary demist outlet;
    a secondary demist outlet; and
    an airflow control door configured to be rotated to each one of the following:
        a defrost mode position in which the airflow control door permits airflow out of the HVAC case through each one of the defrost outlet, the primary demist outlet, and the secondary demist outlet;
        a foot mode position in which the airflow control door limits airflow from exiting the HVAC case through the defrost outlet and the primary demist outlet, and permits airflow out of the HVAC case through the secondary demist outlet; and
        a face mode position in which the airflow control door blocks airflow from exiting the HVAC case through the defrost outlet, the primary demist outlet, and the secondary demist outlet
    wherein:
        the primary demist outlet is between the defrost outlet and the secondary demist outlet; and
        each of the defrost outlet, the primary demist outlet, and the secondary demist outlet span a width of the HVAC case and overlap along a depth of the HVAC case, the width is perpendicular to, and longer than, the depth.

10. The HVAC case of claim 9, wherein the primary demist outlet is larger than the secondary demist outlet.

11. The HVAC case of claim 10, wherein the HVAC case includes a housing defining the defrost outlet, the primary demist outlet, and the secondary demist outlet.

12. The HVAC case of claim 11, wherein the housing includes an L-shaped divider dividing the primary demist outlet from the secondary demist outlet.

13. The HVAC case of claim 9, wherein the airflow control door is rotatable about a rotation axis.

14. The HVAC case of claim 9, wherein the defrost outlet is larger than each one of the primary demist outlet and the secondary demist outlet.

15. The HVAC case of claim 14, wherein the defrost outlet is larger than the primary demist outlet and the secondary demist outlet combined.

16. The HVAC case of claim 9, wherein the HVAC case includes a heater core configured to heat airflow that exits the HVAC case through one or more of the defrost outlet, the primary demist outlet, and the secondary demist outlet.

17. The HVAC case of claim 9, wherein the HVAC case further includes a face outlet and a foot outlet.

18. The HVAC case of claim 17, further comprising a rear airflow outlet.

* * * * *

UNITED STATES PATENT AND TRADEMARK OFFICE
CERTIFICATE OF CORRECTION

PATENT NO. : 11,577,696 B2
APPLICATION NO. : 16/814188
DATED : February 14, 2023
INVENTOR(S) : Brian Belanger et al.

Page 1 of 1

It is certified that error appears in the above-identified patent and that said Letters Patent is hereby corrected as shown below:

In the Claims

Column 6, Line 32: In Claim 9, after "outlet", insert --;--

Signed and Sealed this
Fourth Day of April, 2023

Katherine Kelly Vidal
*Director of the United States Patent and Trademark Office*